United States Patent [19]

de Sartre et al.

[11] Patent Number: 4,692,853
[45] Date of Patent: Sep. 8, 1987

[54] CONTROL CIRCUIT FOR A CHOPPED POWER SUPPLY WITH PROGRESSIVE START UP

[75] Inventors: Jean de Sartre, Meylan; Philippe Maige, Syssinet Pariset, both of France

[73] Assignee: Thomson-CSF, Paris, France

[21] Appl. No.: 826,986

[22] Filed: Feb. 7, 1986

[30] Foreign Application Priority Data

Feb. 8, 1985 [FR] France .................. 85 01822

[51] Int. Cl.⁴ .................................. H02P 13/22
[52] U.S. Cl. ....................... 363/49; 363/97; 323/901
[58] Field of Search .................. 363/20–21, 363/49, 56, 97, 131; 323/901, 908

[56] References Cited

U.S. PATENT DOCUMENTS

| | | | |
|---|---|---|---|
| 3,733,540 | 2/1972 | Hawkins | 363/89 |
| 3,879,647 | 4/1975 | Hamilton et al. | 363/49 X |
| 4,195,335 | 3/1980 | Murakami et al. | 363/49 |
| 4,272,805 | 6/1981 | Iguchi et al. | 363/56 X |
| 4,400,767 | 8/1983 | Fenter | 363/21 |
| 4,504,898 | 3/1985 | Pilukaitis et al. | 363/49 |
| 4,586,120 | 4/1986 | Malik et al. | 363/49 X |

FOREIGN PATENT DOCUMENTS 0144754 11/1984 European Pat. Off. .

OTHER PUBLICATIONS

E.D.N. Electrical Design News, vol. 29, No. 18, Sep. 1984, pp. 213–220, Boston, U.S.; G. Gattavari: "Design Custom Power Sources with Switching-Regulator Chip".

Primary Examiner—Peter S. Wong
Attorney, Agent, or Firm—Oblon, Fisher, Spivak, McClelland & Maier

[57] ABSTRACT

A chopped power supply control circuit is provided intended to receive regulation control signals and to produce square waves for enabling a switch. A current comparator measures the current in the switch and opens the switch when the threshold is exceeded. Under normal operating conditions the threshold is fixed. Under start-up conditions of should a malfunction occur a threshold variation circuit causes the threshold to vary gradually from a low value to its normal value. Thus the risk of over-current at start-up is reduced.

7 Claims, 7 Drawing Figures

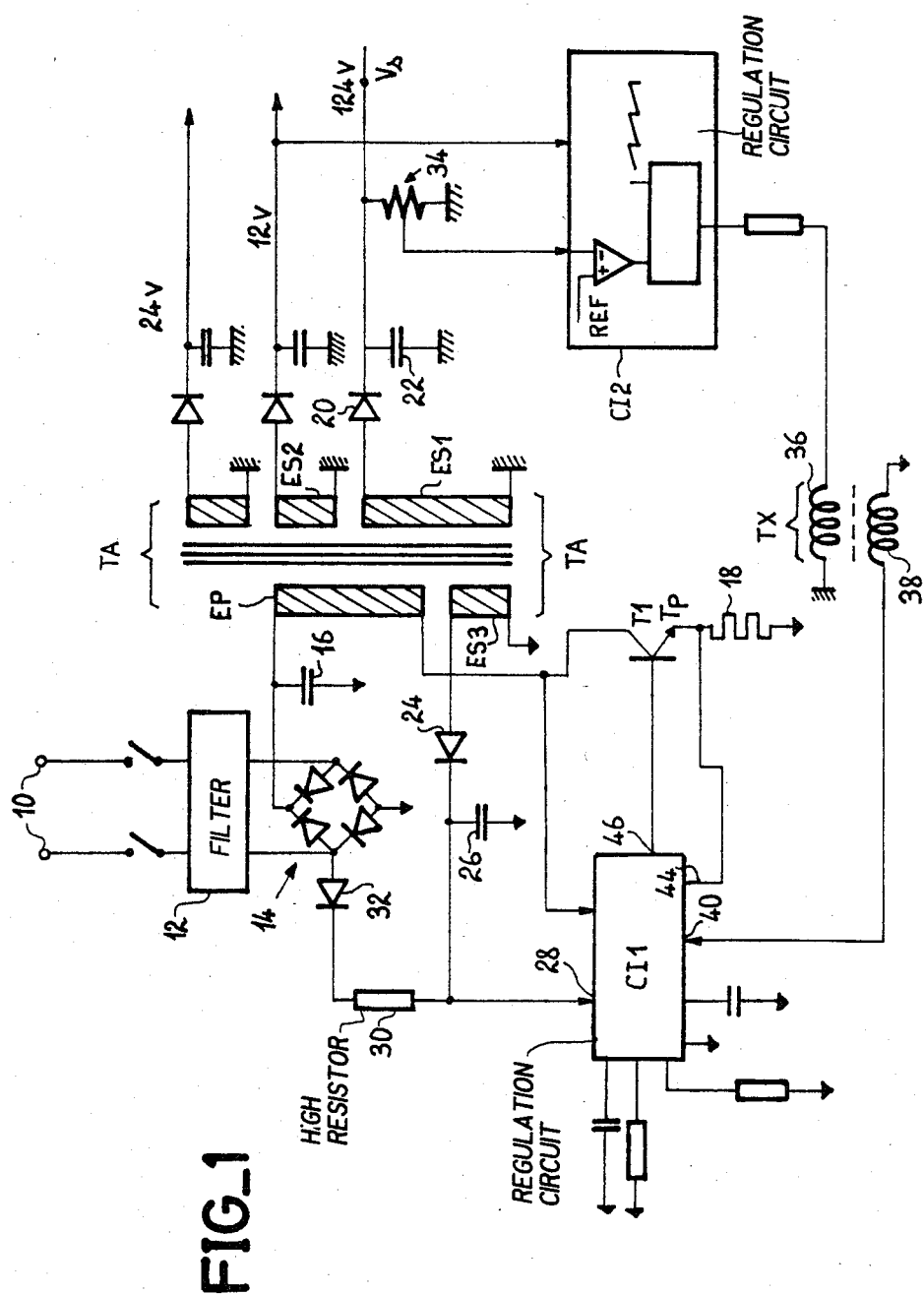
FIG_1

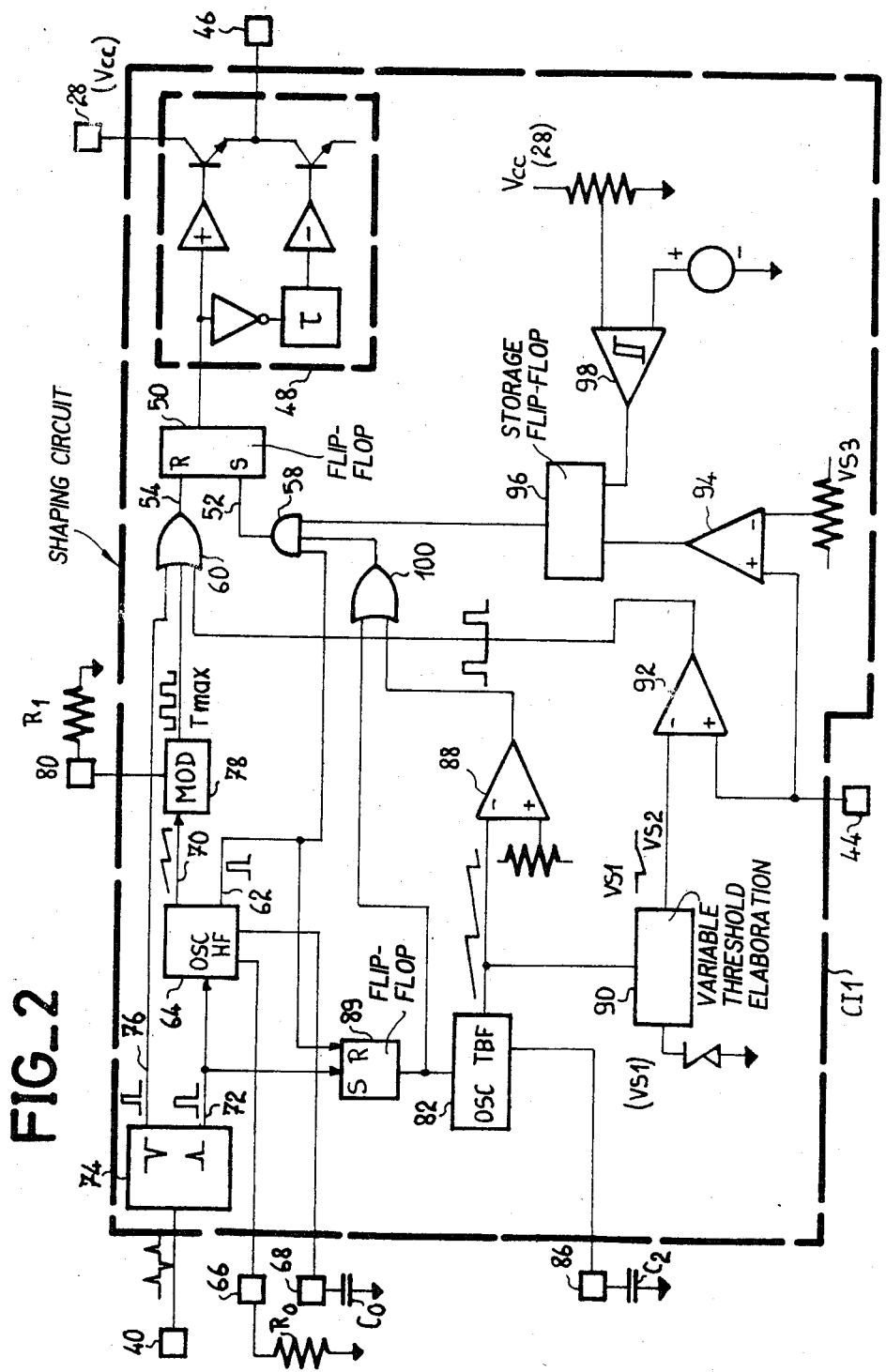
FIG_2

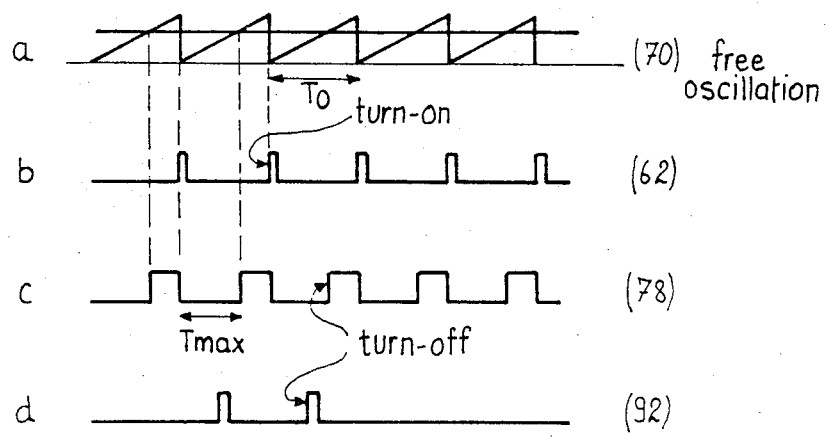
FIG_3
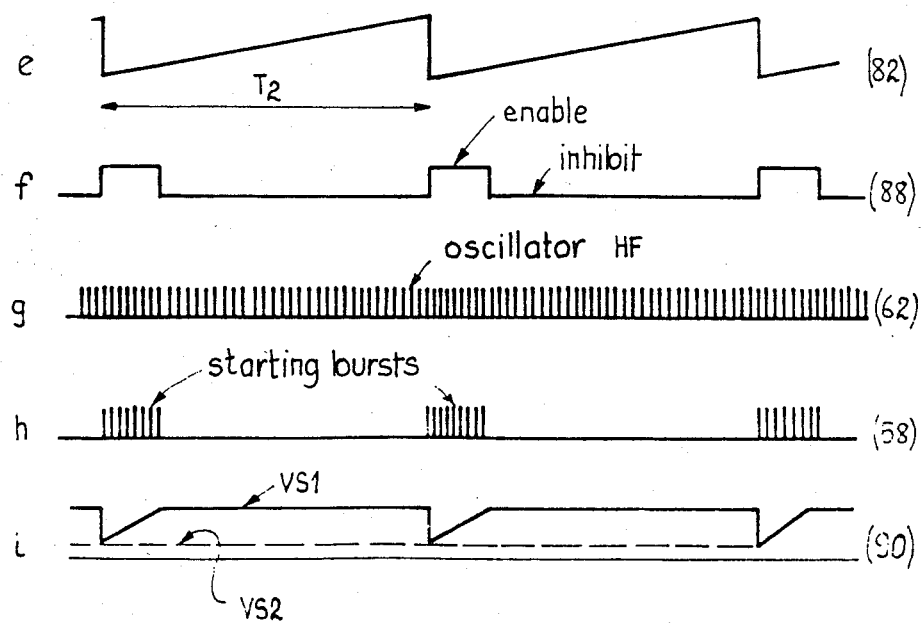
FIG_4

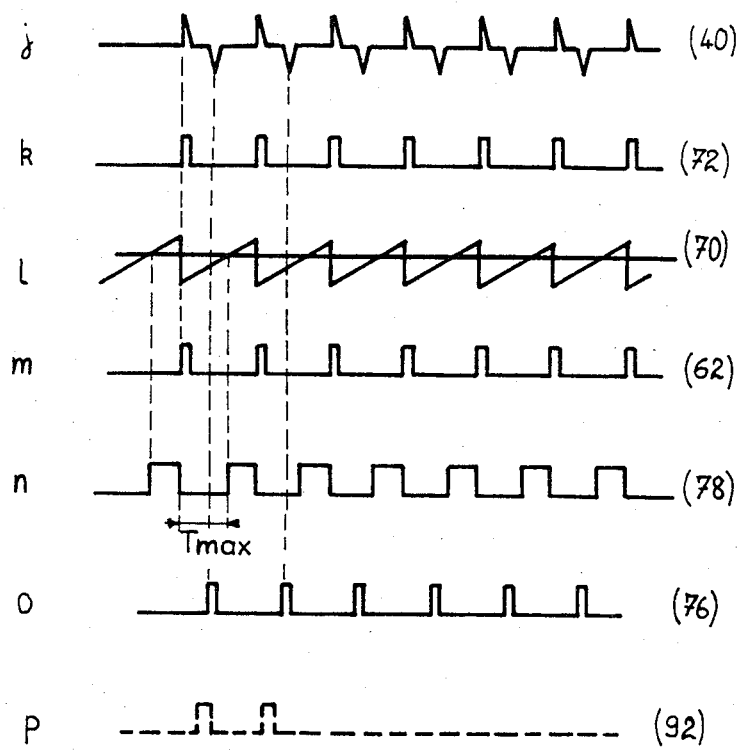
FIG_5
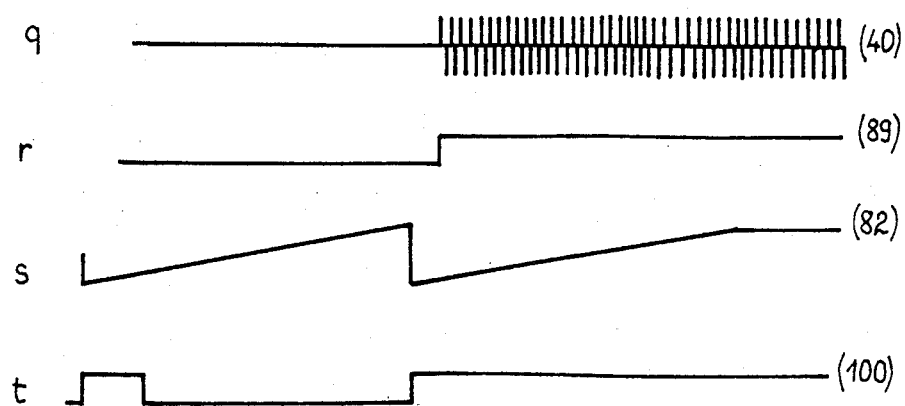
FIG_6

FIG_7
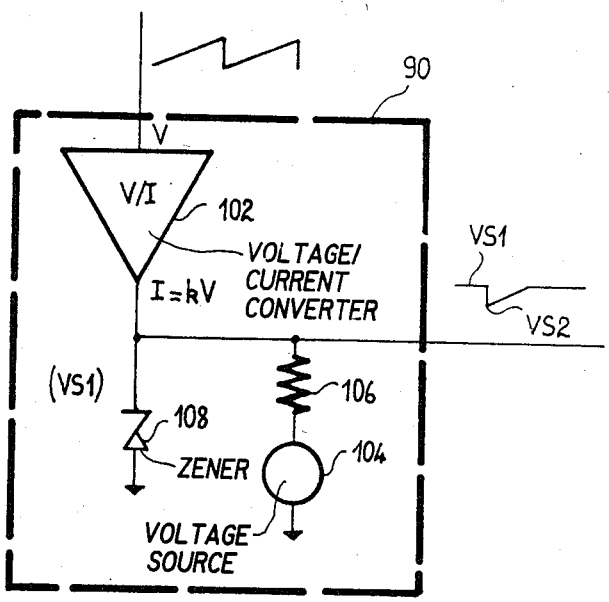

CONTROL CIRCUIT FOR A CHOPPED POWER SUPPLY WITH PROGRESSIVE START UP

BACKGROUND OF THE INVENTION

The present invention relates to stabilized power supplies called chopped supplies.

A chopped power supply operates in the following way: a primary transfer winding receives a current which is for example delivered by a rectifier bridge receiving the power of the AC mains. The current in the transformer is chopped by a switch (for example a power transistor) placed in series with the primary winding.

A circuit for controlling the transistor produces periodic square waves for enabling the transistor. A current is allowed to pass for the duration of the square waves; outside the square wave, the current cannot pass.

On one (or more) secondary windings of the transformer, an AC voltage is collected. This is rectified and filtered so as to obtain a DC voltage which is the output DC voltage of the chopped power supply.

For stabilizing the value of this DC voltage, the cyclic period conduction ratio of the switch is adjusted, that is to say the ratio between the duration of conduction and the duration of non conduction in a chopping period.

In chopped power supply architecture proposed by the applicant and shown in FIG. 1, two integrated circuits are used. One of the circuits CI1, serves for controlling the base of a power transistor $T_p$ for applying thereto periodic enabling and disabling control signals. The base control circuit CI1 is placed on the primary winding side (EP) of the transformer (TA) for reasons which will be better understood in the rest of the description. The other integrated circuit, regulation circuit CI2, is on the contrary placed on the secondary side (winding ES1) and it serves for examining the output voltage Vs of the power supply for forming regulation signals which it transmits to the first integrated circuit through a small transformer TX. The first integrated circuit CI1 uses these regulation signals for modifying the cyclic conduction ratio of the switching transistor $T_p$ and thus regulating the output voltage Vs of the power supply.

We will come back further on in more detail to the circuit of FIG. 1.

Numerous problems arise during the design of a chopped power supply, and here we will consider more particularly the problems of starting up the supply and the problems of safety in the case of over voltages or over currents at different points in the circuit.

The first problem which is met with is that of starting up the power supply: at switch on, the regulation circuit CI2 will tend to cause the base control circuit CI1 to generate maximum cyclic ratio square waves until the power supply has reached its nominal output voltage. This is all the more harmful since there is a high current drain on the side of the secondary windings which are connected to initially discharged filtering capacitors. There is a risk of destruction of the power transistor through an overcurrent during the start up phase.

Circuits for gradual start up have already been proposed which limit the duration of the enabling square waves during a start up phase, on switching on the device; the U.S. Pat. No. 3,959,714 describes such a circuit in which charging of a capacitor from switch-on defines initially short square waves of gradually increasing duration until these square waves reach the duration which the regulation circuit normally assigns to them. The short square waves have priority; but, since they become gradually longer during the start up phase, they cease to have priority after a certain time; this time is defined by the charging time constant of the capacitor.

Another problem to be reckoned with is the risk of accidental over-currents, or sometimes over-voltages which may occur in the circuit. These overcurrents and over-voltages may be very detrimental and often result in the destruction of a power transistor if nothing is done to eliminate them. In particular, a short circuit at the output of the stabilized power supply rapidly destroys the power transistor. If this short circuit occurs on switching-on of the supply, it is not the gradual start up system with short and progressively increasing square waves which can efficiently accomodate the over-currents which result from this short circuit.

Finally, another problem particularly important in an architecture such as the one shown in FIG. 1, is the risk of disappearance of the regulation signal which should be emitted by the regulation circuit CI2 and received by the base control circuit CI1: these signals determine not only the width of the square waves enabling the power transistor but also their periodicity; in other words, they serve for establishing the chopping frequency, possibly synchronized from a signal produced on the secondary side of the transformer. The appearance of these signals causes a particular disturbance which must be taken into account.

Furthermore, the architecture shown in FIG. 1, in which the secondary circuits have been voluntarily separated galvanically from the primary circuits, is such that the base control circuit may operate rapidly after switch-on, as will be explained further on, whereas the regulation circuit CI2 can only operate if the chopped power supply is operating; consequently, at the beginning, the base control circuit CI1 does not receive any regulation signals and this difficulty must be taken into account.

SUMMARY OF THE INVENTION

To try and overcome as well as possible all these different problems which relate to security against accidental disturbances in the operation of the power supply (the initial start up being more-over considered as a transitory disturbed operating phase), the present invention provides an improved chopped power supply control circuit which provides a function of gradual start-up power supply on switch on and a function of passing to a safety mode in the case of an operating defect such as a disappearance of appropriate regulation signals; the safety mode consists of a succession of periodic cycles at a very low frequency, each cycle consisting of a gradual start-up attempt during a first phase which is short in comparison with the period of the cycle and long compared with the chopping period of the chopped power supply, the first phase being followed by a pause until the end of the cycle, and periodic cycles succeeding each other until normal operation of the power supply is established or re-established; a very low frequency oscillator establishes these cycles when the power supply is not operating under normal conditions (start-up or operating defect); this oscillator is disabled should normal operation be ascertained; a high frequency oscillator generates a burst of chopping signals palliating the absence of regulation signals; these signals are transmitted solely during the first phase of each cycle; they are inhibited during a second phase.

According to a very important characteristic of the invention, the gradual start up operates not by limiting the duration of the square waves from the charging of a capacitor with a fixed time constant, but by limiting the current in the power transistor to a maximum value, this maximum value increasing progressively during the start up phase, over-shooting of this current value causing interruption in the conduction of the power transistor.

Thus, even in the case of a quasi short circuit, the value of the current in the transistor is limited, which was not the case in the gradual start up circuits of the prior art.

More precisely, the chopped power supply control circuit of the invention is intended to receive regulation control signals and to produce square waves for enabling a main switch of the power supply, the square waves having a variable width depending on the signals received, and this circuit comprises a current limiting circuit including a threshold comparator receiving at one input a signal representative of the current flowing through the switch and at another input a threshold signal, the comparator generating a signal for stopping the switch from conducting should over shooting of the threshold occur; furthermore, in order to ensure gradual start-up of the chopped power supply at the beginning of its operation and should this operation be disturbed, the control circuit comprises a means for producing a variable threshold signal for the comparator, this means being adapted for:

establishing a first fixed threshold value under normal operating conditions, establishing a periodic threshold variation cycle outside normal operating conditions, this cycle consisting in:

causing the threshold to pass suddenly from the first value to a second value, at a time representing the beginning of the cycle, the second value corresponding to a lower current in the switch, bringing the threshold gradually back from the second value to the first in a first part of the threshold variation cycle, holding the threshold at the first value until the end of the current cycle, beginning again a second threshold variation cycle at the end of the current cycle, stopping the production of threshold variation cycles when normal operating conditions have again been established.

Normal operating conditions will in general be defined by the presence of appropriate regulation signals and by the absence of an over-current in the switch.

The periodic cycle is at very low frequency (for example 1 hz), and the duration of a first part of the cycle is preferably small with respect to the period of the cycle (for example a tenth of this period, followed by a pause during the nine remaining tenths); it is long with respect to the chopping period of the power supply.

In order to provide even more complete safety, a second threshold comparator is preferably provided receiving at one input a signal respresentative of the measurement of the current in the switch and at another input a third threshold value corresponding to a current greater than that of the first threshold value, the comparator delivering a signal for complete inhibition of the switching of the power switch should over-shooting of this third value occur, the inhibition only ceasing when the circuit, after having partially or completely ceased to be supplied with power, is again normally supplied.

BRIEF DESCRIPTION OF THE DRAWINGS

Other features and advantages of the invention will be clear from reading the following detailed description made with reference to the accompanying drawings in which:

FIG. 1 shows a general chopped power supply diagram using two integrated circuits placed respectively on the primary side and on the secondary side of a transformer, FIG. 2 shows a diagram of the integrated control circuit of the power transistor placed on the primary side, FIGS. 3 to 6 show timing diagrams of signals at different points on the circuit, and FIG. 7 shows a detail of a circuit for elaborating a variable threshold.

DESCRIPTION OF THE PREFERRED EMBODIMENT

Referring to FIG. 1 which shows a chopped power supply architecture given by way of example and well illustrating the utility of the invention, the electric mains line has been designated by the reference 10 (mains at 110 to 220 volts, 50 or 60 hertz). This line is connected through a filter 12 to the input of a rectifier bridge 40 whose output is connected on the one hand to a primary electric ground, represented everywhere by a downward pointing black triangle, and on the other hand to one end of the primary winding EP of the power supply transformer TA.

A filtering capacitor 16 is placed in parallel across the outputs of the rectifier bridge 14. The other end of the primary winding is connected to the collector of a switching transistor TP whose emitter is connected to the primary ground through a small current measuring resistor 18.

The transformer has several secondary windings which are preferably isolated galvanically from the mains and connected for example to a secondary electric ground isolated galvanically from the primary ground.

Here, each of the secondary windings has one end connected to the secondary ground. The other end feeds a respective low-pass filtering capacitor through a respective rectifier diode.

We will be concerned in what follows with a single secondary winding ES1, connected by a diode 20 to a capacitor 22. The DC output voltage of the chopped power supply is the voltage Vs at the terminals of the capacitor 22; but of course, other DC output voltages may be obtained at the terminals of the other filtering capacitors connected to the secondary windings. These output voltages form stabilized power supply voltages for user circuits not shown. By way of example, a secondary winding ES2 supplies a stabilized power supply voltage of a few volts for the integrated regulation circuit CI2 already mentioned. It can therefore be seen in this connection that this circuit is not supplied with power and cannot therefore supply signals as long as the chopped power supply is not operating.

The same goes a priori for the integrated circuit CI1 controlling the base of the power transistor TP, which circuit is supplied with a stabilized voltage delivered by a secondary winding ES3, a diode 24 and a capacitor 26 (it will be noted in passing that this winding, although being a secondary winding, is connected to the primary ground and not to the secondary ground, for the very simple reason that the integrated circuit CI1 is necessarily coupled galvanically to the primary).

However, since start up of the chopped power supply must be provided, the power supply terminal 28 of the integrated circuit CI1 is also connected directly to the mains through a high resistor 30 and a diode 32; this is possible since the integrated circuit CI1 is connected to the primary ground; it is not possible for the integrated circuit CI2 which must remain galvanically isolated from the mains. As soon as the chopped power supply is operating normally, the stabilized DC voltage from winding ES3 and diode 24 takes precedence over the voltage coming from the mains and from diode 32; this diode 32 is disabled and the direct supply by the mains only takes place after the initial start up phase.

The role of the integrated circuits CI1 and CI2 will now be described.

The regulation circuit CI2 receives from a divider bridge 34, placed at the terminals of capacitor 22, i.e. at the output of the stabilized power supply, information concerning the value of the voltage to be stabilized Vs.

This information is compared with a reference value and applied to a pulse width modulator which forms periodic square waves of variable width depending on the value of the output voltage Vs: the lower Vs the wider the square waves will be.

The square waves are established at the chopping frequency of the chopped power supply. This frequency is therefore established on the secondary side of the circuit; it is generated either inside the circuit CI2, or outside in a circuit not shown, in the form of a saw tooth voltage at the chosen chopping frequency. This saw tooth voltage is used in a way known per se for providing width modulation.

The variable width square waves, at the chopping frequency, are applied to a primary winding 36 of a small transformer TX whose secondary winding 38, isolated galvanically from the primary, delivers positive and negative pulses at the rising and falling fronts respectively of the variable width square waves.

It is these pulses, whose position and frequency are determined by the regulation circuits CI2, which form regulation signals applied to an input 40 of the base control circuit CI1.

The transformer TX is formed by a few turns wound on a ferrite rod, the turns of the primary and the turns of the secondary being sufficiently spaced apart from each other for complying with standards of galvanic isolation between primary circuits and secondary circuits of the chopped power supply.

The integrated base control circuit CI1 comprises different inputs among which have already been mentioned a power supply input 28 and a regulation signal input 40; a current measuring input 44 is connected to the current measuring resistor 18; an inhibition input for monitoring the magnetization condition of a transformer. Finally, inputs may be provided for connecting elements (resistors, capacities) which should form part of the integrated circuit itself but which for technological reasons (space limitation) or for practical reasons (possibilities of adjustment by the user) are mounted outside.

The integrated circuit CI1 finally comprises an output 46 which is intended to be connected by direct galvanic coupling to the base of the power transistor $T_p$. This output delivers square waves for enabling and disabling the transistor $T_p$.

FIG. 2 shows the general architecture of the integrated circuit CI1, limited to the elements which more especially concern the invention.

The output 46 of the circuit is the output of a push-pull amplification stage designated as a whole by the reference 48, this stage comprising preferably two separate amplifiers one of which receives enabling square waves and the other receives disabling signals formed by the inverted enabling signals delayed by a few microseconds. Such amplifiers are now well known.

The enabling signals are provided by a logic flip flop 50 having a set input 52 and a reset input 54. The set input causes enabling of the power transistor. The reset input causes disabling.

The set input 52 receives the pulses which pass through a logic AND gate 58, so that conduction only occurs if several conditions are satisfied simultaneously; one unsatisfied condition, will be sufficient to inhibit enabling of the conduction.

The reset input 54 receives the pulses which pass through a logic OR gate 60, so that stopping of the conduction (after enabling) will occur as soon as a stop signal is present at one of the inputs of this gate.

In the diagram of FIG. 2, the AND gate 58 has three inputs. One of these inputs receives periodic pulses from an output 62 of a high frequency oscillator 64; the other inputs serve for inhibiting the transmission of these pulses.

The oscillator defines the periodicity of the chopping of the power supply (20 kilohertz for example). Under normal operating conditions, the oscillator is synchronized by the regulation signals; under start-up conditions it is self-oscillating at a free frequency defined by the values of a resistor $R_o$ and a capacitor $C_o$ external to the integrated circuit CI1 and connected respectively to an access terminal 66 and an access terminal 68. The free frequency fo is generally slightly lower than the normal chopping frequency.

Oscillator 64 is a relaxation oscillator which produces at an output 70 a saw tooth whose return to zero is caused by the appearance of a positive pulse at terminal 40. This is why oscillator 64 is shown with one input connected to an output 72 of a shaping and separation circuit 74 which receives the regulation signals from terminal 40 and shapes them while separating the positive pulses from the negative pulses. The shaping circuit 74 has two outputs: 72 for the positive pulses, 76 for the negative pulses (the notation positive pulse and negative pulse will be kept for distinguishing the pulses causing conduction and the pulses stopping conduction even if the shaping circuit establishes pulses of the same sign at both its outputs 72 and 76).

The oscillator 64 has two outputs: one output 70 delivering a saw tooth and one output 62 delivering a short pulse during the zero return of the saw tooth.

A pulse width modulator 78 is connected on the one hand to the output 70 of the oscillator and on the other to a reference voltage adjustable by means of a resistor R1 external to the integrated circuit and connected to a terminal 80 giving access to the circuit. Modulator 78 supplies periodic square waves synchronized with the signals of the oscillator, these square waves defining a maximum conduction time Tmax beyond which the power transistor must be disabled in any case for safety's sake. These square waves of modulator 78 are applied to one input of the OR gate 60. The time Tmax is adjustable by means of the external resistor R1.

The elements which have just been described ensure the essential part of the operation under normal conditions of the integrated circuit CI1. The following elements are more specifically provided for controlling the abnormal operation or start-up of the power supply.

A very low frequency oscillator 82 is connected to an external capacitor C2 through an access terminal 86. This external capacitor allows the very low oscillation frequency to be adjusted. The frequency may be 1 hertz for example.

Oscillator 82 is a relaxation oscillator delivering a saw tooth. This saw tooth is applied on the one hand to a threshold comparator 88 which allows periodic square waves to be established synchronized with the very low frequency saw tooth of the oscillator. These square waves have a very short duration compared with the period of the saw tooth; this duration is set by the threshold of the comparator 88; it may for example be 10% of the period; it must be long compared with the free oscillation period of the high frequency oscillator 64 so that a burst of numerous pulses from the high frequency oscillator may be emitted and used during this 10% of this very low frequency period; this burst defines a start-up attempt during the first part of a start-up cycle; it is followed by a pause for the rest of the period, i.e. during the remaining 90%.

The oscillator only serves at start-up; it is inhibited when regulation signals appear at terminal 40 and indicate that the chopped power supply is operating. This is why an inhibition control of this oscillator has been shown connected to the output 72 of the shaping circuit 74 through a flip flop 89. This flip flop changes state under the action of the pulses appearing at output 72. It is brought back to its initial state by the output 62 of oscillator 64 when there are no longer any pulses at output 72.

The saw teeth of the very low frequency oscillator are further fed to a variable threshold elaboration circuit 90 whose purpose is to establish a threshold signal (current or voltage) having a first value Vsl under normal operating conditions, and a cyclically variable threshold between the first value and a second value under start-up conditions. The mode of variation of this threshold will be described further on, but it may already be noted that the variation is driven by the very low frequency saw tooth.

The threshold signal produced by circuit 90 is applied to one input of a comparator 92, another input of which is connected to the terminal 44 already mentioned, for receiving at this input a signal representative of the amplitude of the current flowing through the power switch. The output of comparator 92 is applied to an input of the OR gate 60. It operates then for causing the power transistor $T_p$ to be disabled, after being enabled, disablement occurring as soon as overshooting of the threshold (fixed or variable) defined by circuit 9 has been detected.

Another threshold comparator 94 has one input connected to the current measuring terminal 44 whereas another input receives a signal representing a third threshold value Vs3. The third value Vs3 corresponds to a current in the switch higher than the first value Vsl defined by circuit 90. The output of comparator 94 is connected through a storage flip flop 96 to one input of the AND gate 58 so that, if the current in the power switch exceeds the third threshold value Vs3, transistor $T_p$ is not disabled (such disablement is caused by comparator 92) but the transistor is inhibited from being enabled again. This inhibition lasts until the flip flop 96 is brought back to its initial state corresponding to normal operation.

In theory, such re-setting will only take place when the integrated circuit CI1 has ceased to be normally supplied with power and has again power applied thereto.

For example, re-setting of flip flop 96 takes place through a hysteresis threshold comparator 98 which compares a fraction of the supply voltage Vcc of the circuit (taken from terminal 28) with a reference value and which re-sets the flip flop the first time that Vcc passes above this reference after a drop of Vcc below another reference value lower than the first one (hysteresis). Finally, it should be mentioned that the output of the flip flop 89 (which detects the presence of regulation signals at terminal 40 so normal operation of the power supply), is connected to one input of an OR gate 100 which receives at another input the output of the comparator 88 so that the output of comparator 88 ceases to inhibit the re-enabling of transistor $T_p$ (inhibition during 90% of the very low frequency cycles) as soon as the operation of the power supply has become normal.

OPERATION OF THE BASE CONTROL CIRCUIT

This operation will be described by illustrating it with voltage wave forms within the chopped power supply and within the integrated circuit CI1.

(a) Start-up on switching on

At the beginning the integrated circuit is not at all supplied with power.

The voltage at the power supply terminal 28 increases from 0 to a value Vaa which is not the nominal value Vcc but which is a lower value supplied by diode 32 and resistor 30 (compare FIG. 1) as long as the chopped power supply does not deliver its nominal output voltage Vcc at terminal 28. Vaa is a sufficient voltage for ensuring practically normal operation of all the elements of the circuit CI1. Vaa is also sufficient for reinitializing the flip flop 96 which, from then on, no longer inhibits the enabling of the power transistor $T_p$.

There are no regulation signals at the input 40. Consequently, the high frequency oscillator oscillates at its free frequency and the very low frequency oscillator also oscillates (it is not inhibited by the flip flop 89 since this latter does not receive any regulation signals from the output 72 of the shaping circuit 74).

The very low frequency oscillator 82 and the comparator 88 define periodic cycles of start-up attempts repeated at very low frequency.

Each cycle comprises a first part defined by the square waves of short duration at the output of the comparator 88, and a second part formed by the end of the very low frequency period; the first part is an effective attempt at start-up. The second part is a pause if the effective attempt has failed. The pause lasts much longer than the effective attempt so as to limit power consumption. During the first part of the cycle, passage of the enabling signals from the high frequency oscillator 64 is allowed through the AND gate 48. Then it is prohibited. Each pulse from the output 62 of the oscillator 64 triggers off the enabling of transistor $T_p$. There is then a burst of triggering pulses which is emitted for about 10% of the verylow frequency period.

During start up, the current intensities in the transistor tend to be high. It is essentially the comparator 92 which causes interruption of the conduction, after each enabling pulse supplied by oscillator 64, as soon as the current exceeds the threshold imposed by the variable threshold elaboration circuit 90. If the comparator 92 does not trigger off interruption of the conduction, the modulator 78 will do it in any case at the end of the duration Tmax.

The threshold elaboration circuit which supplies the comparator 90 with a first fixed threshold value Vs1 under normal operating conditions (i.e. when the very low frequency oscillator 82 is disabled by the flip flop 89), delivers a variable threshold as a function of the saw tooth of the very low frequency oscillator in the following way:

at the initial time of a start-up attempt cycle (start of the saw tooth or return to zero of the preceding saw tooth), the threshold passes suddenly from the first value Vs1 to a second value Vs2 corresponding to a smaller current than for the first value, then this threshold increases progressively (because driven by the very low frequency saw tooth) from the second value to the first one. The duration of the increase coincides preferably with the duration of a start-up attempt square wave (namely about 10% of the very low frequency period).

Then the threshold stabilizes at the first value Vs1 until the end of the period but, in any case, if the circuit has not started up at that time, the comparator 88 closes gate 58 through the OR gate 100 and inhibits any subsequent enabling of the power transistor for the rest of the very low frequency period (90%). It is in this case the second part of the start up attempt cycle which takes place: a pause during which the pulses of the oscillator 64 are not transmitted through the AND gate 58.

Thus the start up cycles act on two levels: on the one hand a burst of enabling pulses is emitted (10% of the time) then stopped (90% of the time) until the next cycle; on the other hand, during this burst, the current limitation threshold passes progressively from its second relatively low value to its normal higher value.

Consequently, if we observe the peak amplitude of the current in transistor $T_p$ during the start-up bursts, it can be seen that it increases practically linearly from the second value to the first value. Therefore gradual start-up is obtained by a much more efficient action than that which consists simply for example in causing the time Tmax to increase from a low value to a nominal value. If start up is not successful, a new burst of enabling pulses is transmitted during the first part of the next cycle (it will be recalled that this cycle is repeated about once per second and that the burst may last 100 milliseconds).

If start-up is successful, regulation signals appear at terminal 40. These signals are shaped by circuit 74. They cause the very low frequency oscillator 82 to stop through the flip flop 89 which prevents the zero return of the saw tooth. Moreover, flip flop 89 sends through the OR gate 100 a signal for cancelling out the inhibition effect imposed by the comparator 88. Finally, as soon as start-up is successful, the regulation signals synchronize the high frequency oscillator 64.

FIG. 3 illustrates the high frequency signals during the start-up period:

line a: saw tooth at the output 70 of the oscillator 64 (free oscillation at frequency fo, period To), line b: pulses for enabling the transistor $T_p$: these pulses coincide with the zero return of the saw tooth signal (output 62 of oscillator 64), line c: output square waves from modulator 78 defining the maximum cyclic conduction time of the transistor, line d: pulses delivered by the comparator 92 when the current in the switch exceeds the threshold (gradually increasing during start-up) defined by circuit 90.

Conduction of transistor $T_p$, after being triggered by a pulse from line b, is stopped either by square waves of line c if the current threshold is not exceeded, or by an output pulse from comparator 92.

FIG. 4 shows the very low frequency signals during the start up cycles. The diagrams are not to the same time scale as in FIG. 3 since it will be recalled that an example of the frequency of the high frequency oscillator 64 is 20 kilohertz whereas an example of the very low frequency of oscillator 82 is 1 hertz. The high frequency pulses have however been shown symbolically in FIG. 4, in a more limited number than in reality for facilitating the representation.

line e: saw tooth output of the very low frequency oscillator (frequency f2, period T2), line f: output of the comparator 88 representing the first phase (start-up attempt by causing transistor $T_p$ to be enabled) and the second phase (pause through inhibiting such enabling) during each very low frequency start-up cycle, line g: pulses from the freely oscillating high frequency oscillator, line h: bursts of enabling pulses at the output of the AND gate 58, line i: diagram of the cyclic variation of the threshold elaborated by circuit 90 during the start up cycles: fixed value Vs1 in theory, sudden drop to Vs2 at the beginning of the very low frequency saw tooth, and gradual rise of Vs2 to Vs1, driven by the linear growth of the saw tooth, during the start-up burst.

(b) Operation of the power supply under normal established operating conditions

The very low frequency oscillator is not operating.

The high frequency oscillator is synchronized by the regulation signals.

The zero return of the high frequency saw tooth, coinciding with the positive pulse of the regulation signals, causes transistor $T_p$ to be enabled (no inhibition by the AND gate under normal operating conditions). The negative pulses cause disablement, through the OR gate 64, unless such disablement has been caused:

either by an overshoot of the first current threshold value, detected by comparator 92, or by the modulator 78 if the time interval between the positive pulse and the negative pulse which immediately follows it is greater than the maximum duration Tmax which is permitted.

FIG. 5 shows the high frequency signals under normal operating conditions.

line j: alternate positive and negative pulses received at the input 40 of the circuit (these are the regulation signals defining the times at which the power transistor $T_p$ is enabled and disabled), line k: shaped pulses at the output 72 of the separation and shaping circuit 74: they correspond to the positive pulses only of the regulation signals, line l: saw tooth at the output 70 of oscillator 64; the saw tooth is synchronized with the regulation signals n so that its zero return coincides with the pulses of line k, line m: pulses at the output 62 of oscillator 64; these pulses are emitted during zero returns of the saw tooth of line 1, line n: output square waves of modulator 78, again defining the maximum duration of conduction of the power transistor, line o: pulses coming from the output 70 of the separation and shaping circuit 74: these pulses correspond to the negative pulses of the regulation signals, line p: as a reminder, pulses have been shown at the output of comparator 92 in the case where the current in the power transistor overshoots the threshold corresponding to Vs1.

Transistor $T_p$ after being enabled by a pulse from line k is normally disabled by the pulse from line o which immediately follows it, or, more exceptionally by the pulses from line p if the threshold Vs1 has been exceeded before the appearance of the pulse from line o, or else, by the square waves of line n if the threshold has not been exceeded and if the pulse from line o appears after the beginning of a square wave of line n.

FIG. 6 shows the very low frequency signals at the time of going over from start-up conditions to normal operating conditions (same scale as in FIG. 4).

line q: regulation signals at the input 40; these signals are initially absent and appear at a certain moment, line r: output of the flip flop 89 indicating the absence or the presence of regulation signals, line s: very low frequency saw tooth which rises to its high level and does not drop again if the output of the flip flop 89 is at the high level (indicating the presence of regulation signals), line t: output of the OR gate 100 showing initially a square wave of short duration, coming from comparator 88 and allowing a start-up burst (cf. FIG. 4), then blocking at the high level which prevents subsequent inhibition of the AND gate 58 by the comparator 88.

(c) Safety mode in the case of a malfunction

The safety mode consists in fact in establishing start-up cycles as for switching on.

These cycles are triggered off by starting up the very low frequency oscillator 82 when the regulation signals disappear at input 40.

The flip flop 89 goes back to an initial state when it no longer receives pulses from the output 72 of the separation and shaping circuits 74. Thus oscillator 82 will be able to oscillate again and the above described cycles are established.

(d) Serious malfunction: very high over current.

Whatever the operating conditions, normal or start-up, the over-currents in the transistor $T_p$ are detected by the comparator 92 and cause interruption of the conduction.

But if there is for example a short circuit at the output of the power supply, an over-current may occur such that the current continues to increase before the conduction can be completely interrupted. In this case, it is provided for the threshold comparator 94 to supply an enabling inhibition order when the current in transistor $T_p$ exceeds a third threshold value which is for example higher by 30% than the first value. This inhibition order is stored by the flip flop 96 which switches under the action of the comparator and disables the AND gate 58; the flip flop 96 can only come back to its initial state when the integrated circuit, after having partially or totally ceased to be supplied with power, is again normally supplied with power. For example, the power supply must be switched off and switched on again to again allow the passage of pulses for enabling the transistor $T_p$.

To finish this description, there has been shown in FIG. 7 an example of circuit 90 which elaborates a variable threshold for the comparator 92: the very low frequency saw tooth delivered by the oscillator is applied to a voltage/current converter 102 which produces a current increasing in saw tooth fashion from zero to a maximum value.

This current is applied to a series assembly of a voltage source 104 (value Vs2) and a resistor 106. A voltage clipper, shown by a Zener diode 108 (value of the conduction threshold: Vs1) is placed in parallel across the assembly 104, 106. The junction point between the output of the converter 102, the resistor 106 and the voltage clipper 108 forms the output of circuit 90 and is connected to the input of comparator 92. Thus, at zero return of the saw tooth, the output voltage of circuit 90 is Vs2. Then it increases as the current in resistor 106 increases (linearly). When the voltage at the terminals of resistor 106 reaches and exceeds the value Vs1-Vs2, the voltage clipper conducts and diverts the current surplus so that the output voltage remains limited to Vs1.

What is claimed is:

1. A chopped power supply control circuit intended to receive regulation control signals and to produce square waves for enabling a mains switch of the power supply, wherein said square waves having a variable width depending on the signals received, said circuit comprising:

a current limiting circuit including a threshold comparator receiving at one input a signal and at another input a threshold signal;

a means for said comparator to generate a signal for disabling the switch when the threshold is exceeded, in order to ensure gradual start-up of the chopped power supply at the beginning of its operation and in the case of a disturbance of operation;

a means for establishing a variable threshold signals in response to circuit means which establish a first fixed threshold value under normal established operating conditions, establish periodically a threshold variation cycle in the opposite case, this cycle comprising means to cause the threshold to pass to a second value at a time representing the beginning of a periodic threshold variation cycle, the second threshold value corresponding to a lower current in the switch, means to bring the threshold gradually back from the second value to the first in a first part of the threshold variation cycle, means for maintaining the threshold at the first value until the end of the current cycle, means to begin a second start-up cycle again at the end of the current cycle if regulation control signals are still not received at the end of the first cycle, means for stopping the establishment of threshold variation cycles when regulation control signals are received.

2. The control circuit as claimed in claim 1 wherein the first part of each periodic cycle corresponds to a short time compared with the period of the cycle and a long time compared with the switching period of the chopped power supply.

3. The control circuit as claimed in claim 1, wherein a very low frequency oscillator is provided for defining the periodic two phase threshold variation cycles, said oscillator being inhibited by the reception of appropriate regulation control signals.

4. The control circuit as claimed in claim 3, wherein said very low frequency oscillator is a relaxation oscillator delivering a saw tooth signal driving the threshold establishment means for establishing:
- a sudden variation of the threshold at the time of the zero return of the saw tooth,
- a slow linear increase of the threshold at the beginning of the saw tooth.

5. The control circuit as claimed in claim 4, wherein a high frequency oscillator is provided producing chopping signals palliating the absence of regulation signals for the production of square waves enabling the switch and an inhibition means for allowing transmission of these signals only during the first phase of each periodic cycle.

6. The control circuit as claimed in claim 5, wherein said high frequency oscillator has a free oscillation period slightly greater than the period of the regulation control signals and it is synchronized by these signals when they are received.

7. The control circuit as claimed in claim 1, wherein a second threshold comparator is provided for receiving a signal representative of the current in the switch and delivering a signal completely inhibiting enabling of the switch in the case where the current in the switch exceeds a third threshold value greater than the first value, the signal only ceasing when the circuit, after having partially or totally ceased to be supplied with power, is again normally supplied.

* * * * *